United States Patent
Jeong

(10) Patent No.: US 8,214,618 B2
(45) Date of Patent: Jul. 3, 2012

(54) MEMORY MANAGEMENT METHOD, MEDIUM, AND APPARATUS BASED ON ACCESS TIME IN MULTI-CORE SYSTEM

(75) Inventor: Jae-yong Jeong, Hwaseong-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 828 days.

(21) Appl. No.: 12/216,380

(22) Filed: Jul. 2, 2008

(65) Prior Publication Data

US 2009/0193287 A1 Jul. 30, 2009

(30) Foreign Application Priority Data

Jan. 28, 2008 (KR) .................. 10-2008-0008727

(51) Int. Cl.
*G06F 12/00* (2006.01)
(52) U.S. Cl. ............ 711/170; 711/154; 711/162; 714/3; 712/14; 712/15; 713/1; 713/400
(58) Field of Classification Search .................. 713/400, 713/1; 714/3; 711/170, 162, 154; 712/14, 712/15
See application file for complete search history.

(56) References Cited

U.S. PATENT DOCUMENTS

| | | | | |
|---|---|---|---|---|
| 4,855,903 A * | 8/1989 | Carleton et al. | ............... | 709/248 |
| 6,226,726 B1 * | 5/2001 | Kermani et al. | ............... | 711/170 |
| 6,351,798 B1 * | 2/2002 | Aono | ............... | 712/11 |
| 7,665,089 B1 * | 2/2010 | Vengerov | ............... | 718/102 |
| 7,665,092 B1 * | 2/2010 | Vengerov | ............... | 718/105 |
| 7,793,129 B2 * | 9/2010 | Ogasawara et al. | ............... | 713/323 |
| 2002/0116579 A1 * | 8/2002 | Goodhue et al. | ............... | 711/120 |
| 2006/0038270 A1 * | 2/2006 | Oka | ............... | 257/684 |
| 2006/0080515 A1 * | 4/2006 | Spiers et al. | ............... | 711/162 |
| 2006/0184844 A1 * | 8/2006 | Sakamaki | ............... | 714/701 |
| 2007/0124434 A1 | 5/2007 | Smith et al. | | |
| 2007/0156964 A1 | 7/2007 | Sistla | | |
| 2007/0260827 A1 * | 11/2007 | Zimmer et al. | ............... | 711/154 |

FOREIGN PATENT DOCUMENTS

KR  10-2007-0003515  1/2007

OTHER PUBLICATIONS

Intel Research: Tera-Scale internet article, at http://techresearch.intel.com/ResearchAreaDetails.aspx?Id=27, printed on Nov. 17, 2011.

(Continued)

*Primary Examiner* — Hong Kim
(74) *Attorney, Agent, or Firm* — Staas & Halsey LLP

(57) ABSTRACT

A memory management method and apparatus based on an access time in a multi-core system. In the memory management method of the multi-core system, it is easy to estimate the execution time of a task to be performed by a processing core and it is possible to secure the same memory access time when a task is migrated between processing cores by setting a memory allocation order according to distances from the processing cores to the memories in correspondence with the processing cores, translating a logical address to be processed by one of the processing cores according to the set memory allocation order into a physical address of one of the memories, and allocating a memory corresponding to the translated physical address to the processing core.

15 Claims, 10 Drawing Sheets

OTHER PUBLICATIONS

The Landscape of Parallel Computing Research: A View from Berkeley, Asanovic et al., Dec. 18, 2006, http://www.eecs.berkeley.edu/Pubs/TechRpts/2006/EECS-2006-183.html, printed on Nov. 17, 2011.

Intel Research: Tera-Scale internet article, at http://techresearch.intel.com/ResearchAreaDetails.aspx?Id=27, printed on Nov. 17, 2011 (1 page).

The Landscape of Parallel Computing Research: A View from Berkeley, Asanovic et al., Dec. 18, 2006, http://www.eecs.berkeley.edu/Pubs/TechRpts/2006/EECS-2006-183.html, printed on Nov. 17, 2011 (2 pages).

"The Push of Network Processing to the Top of the Pyramid," Will Eatherton, ANCS, 2005 (30 pages).

* cited by examiner

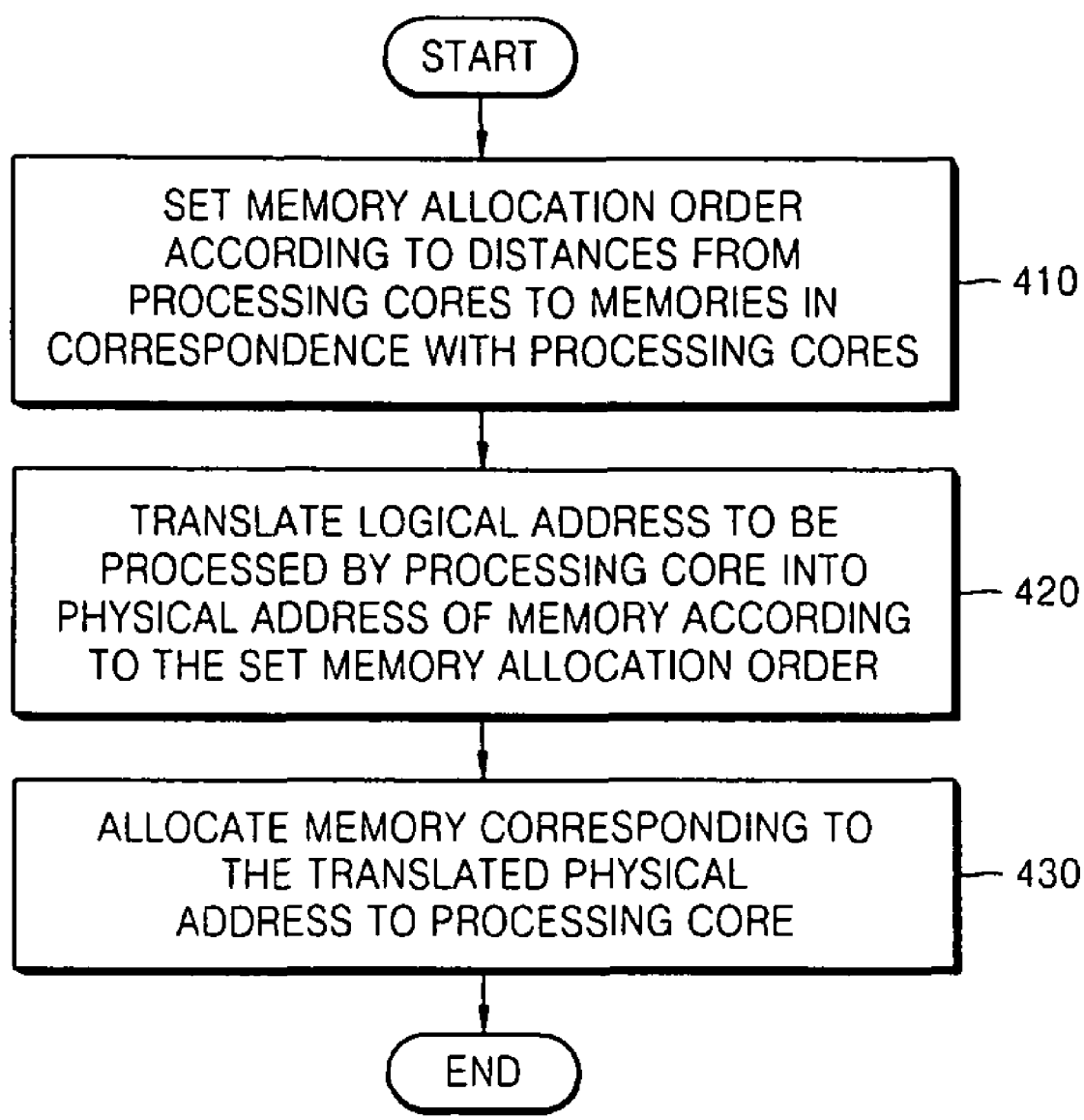

FIG. 9

| LOGICAL ADDRESS (930) | PHYSICAL ADDRESS (950) | DISTANCE (970) |
|:---:|:---:|:---:|
| 0 | 4 | 0 |
| 1 | 0 | 1 |
| 2 | 1 | 1 |
| 3 | 5 | 1 |
| 4 | 6 | 1 |
| 5 | 10 | 2 |
| 6 | 11 | 2 |

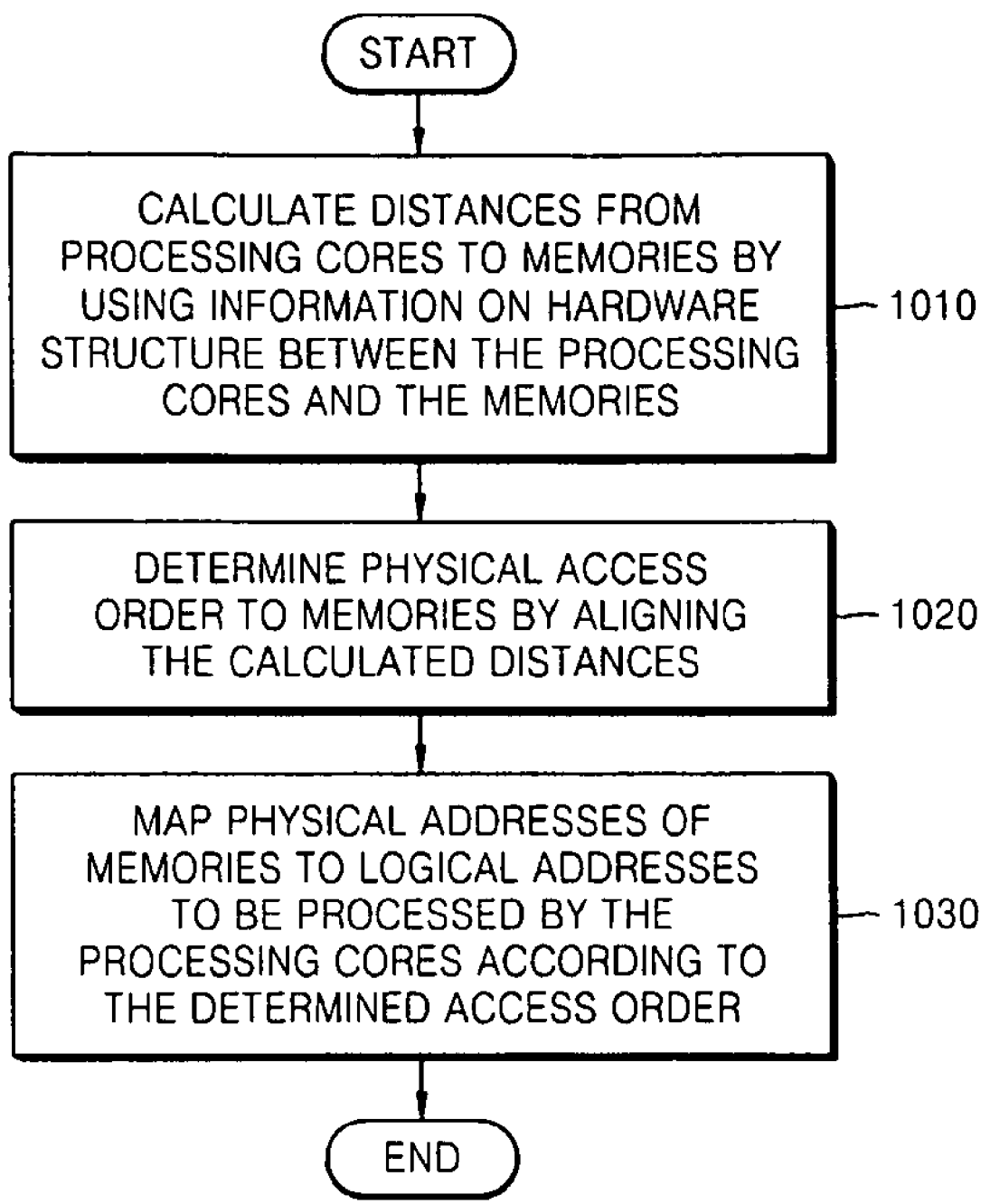

MEMORY MANAGEMENT METHOD, MEDIUM, AND APPARATUS BASED ON ACCESS TIME IN MULTI-CORE SYSTEM

CROSS-REFERENCE TO RELATED APPLICATIONS

This application claims the benefit of Korean Patent Application No. 10-2008-0008727, filed on Jan. 28, 2008, in the Korean Intellectual Property Office, the disclosure of which is incorporated herein in its entirety by reference.

BACKGROUND OF THE INVENTION

1. Field of the Invention

One or more embodiments of the present invention relate to a method, a medium, and apparatus for allocating memories to a plurality of processing cores and managing the memories in a multi-core system including the plurality of processing cores.

2. Description of the Related Art

Developing techniques continue to allow electronic circuits to be miniaturized, and clock cycles to be reduced. Further, improvements in circuit performance are slowing down due to an increase in power consumption of the chips, while current processor architecture increases a storage capacity of a chip. The current processor architecture is developed to work with a system on chips on which a plurality of processing cores are mounted. Methods used for various systems such as a sensor node of a sensor network, a mobile phone, a mobile terminal such as a personal digital assistant (PDA), a base station, a network router, a switching device, and the like by using the system on a chip have been developed. The processor architecture including the plurality of processing cores is referred to as a multi-core system.

In the multi-core system, it is possible to embody parallelism for concurrently performing a plurality of tasks. Accordingly, it is possible to expect considerable improvement in performance as compared with a single core system. However, the performance of the system is not improved in proportion to an increase in the number of processing cores. Accordingly, a method of effectively managing memories is necessary so as to solve a problem in performance deterioration in the multi-core system.

SUMMARY OF THE INVENTION

One or more embodiments of the present invention provide a memory management method, a medium, and an apparatus of a multi-core system capable of solving a problem in that in a multi-core system, memories are not efficiently allocated to processing cores and capable of overcoming a limit in that an execution time of a task to be performed by processing cores is not estimated due to irregularity of access times of the allocated memories.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 is a flowchart of a memory management method of a multi-core system according to an embodiment of the present invention;

FIG. 9 illustrates an example of a structure of a mapping table for translating an address in a multi-core system according to an embodiment of the present invention; and FIG. 10 is a flowchart of a method of setting an allocation order of memories in a multi-core system according to an embodiment of the present invention.

DETAILED DESCRIPTION OF THE PREFERRED EMBODIMENTS

Figure 1:
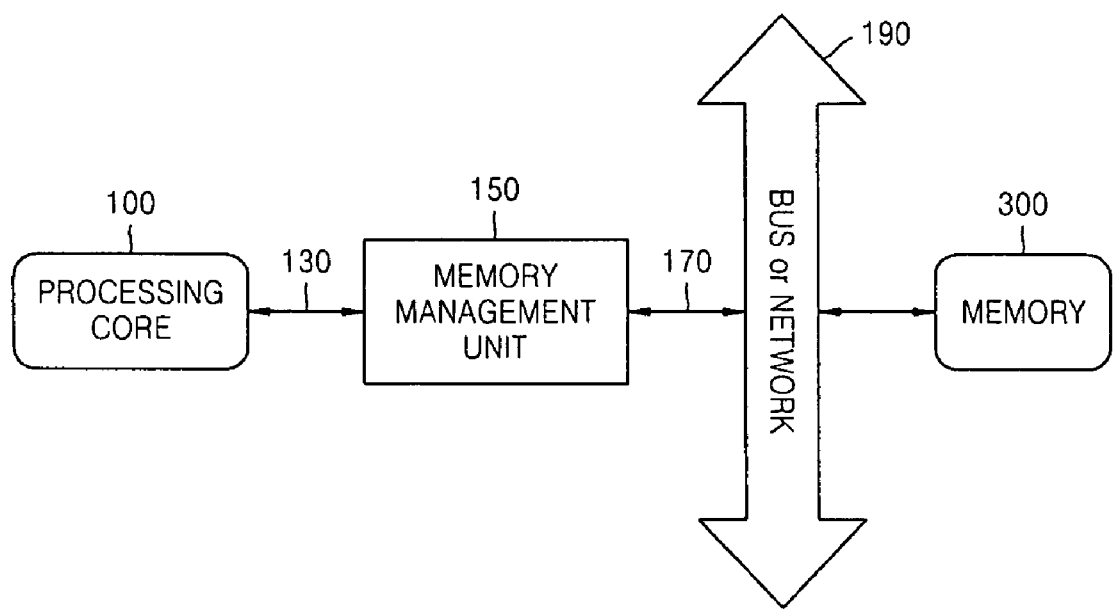
FIG. 1 illustrates an environment in which a memory management apparatus is embodied.

Reference will now be made in detail to embodiments of the present invention, examples of which are illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates an environment in which a memory management apparatus is embodied. The environment includes a processing core 100, a memory management unit (MMU) 150, a bus or network 190, and a memory 300.

The processing core 100 serves to perform a task. Although a multi-core system may include at least two processing cores, a single processing core is illustrated here for convenience.

The MMU 150 serves to translate a software address used for a task (for example, an application program) allocated to the processing core 100 into a hardware address used for a memory or disk. In a computer system, memories (or address spaces) are generally classified into two types. One of the two types is a physical space in which real data or programs are stored, and the other is a logical space used by an application program of an operating system. Here, the former is referred to as a physical address, and the latter is referred to as a logical address. While the physical address is generated by allocating a memory chip or disk space, the logical address is a space for allocating program codes or data structure for the convenience of a programmer or application program. The memory size (unit) of the logical address may be changed based on a type of a corresponding system or program. Accordingly, the MMU 150 enables the logical address 130 to correspond to the physical address 170 through mapping.

In FIG. 1, in order to conceptually describe the processing core 100 and the MMU 150, the processing core 100 and the MMU 150 are separated from each other. However, the processing core 100 and the MMU 150 may be embodied as a single, physical device. If the MMU 150 is included in the processing core 100, memory mapping from the logical address 130 to the physical address 170 may be embodied by using software without a separate hardware memory. On the contrary, if the MMU 150 is not included in the processing core 100, memory mapping may be embodied by using separate hardware. In addition, this memory mapping may be embodied by using a memory or a disk device in which a mapping table is stored, a relocation register, and the like. A plurality of MMUs 150 may exist in correspondence with the processing core 100. The number of MMUs 150 need not be the same as the number of processing cores 100.

The bus 190 is a path for connecting resources of a multi-core system. A plurality of processing cores 100 may be connected to the MMUs 150 through a network. The memory 300 is a resource to be allocated to the processing cores 100. Although a plurality of memories 300 may exist via the bus or network 190, in FIG. 1, a single memory is illustrated for convenience. Although not shown in FIG. 1, a disk or an input and output device and a display device, which are included in a general computer system, may be added.

Figure 2:
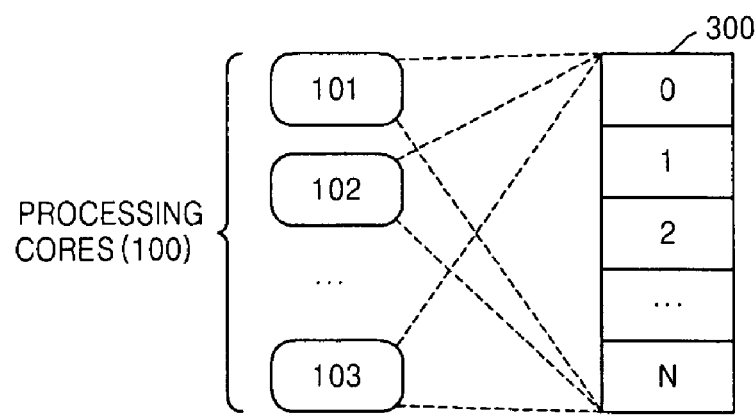
FIG. 2 illustrates a method of using a memory in a multi-core system.

FIG. 2 illustrates a method of using a memory in a multi-core system. In FIG. 2, a method in which the plurality of processing cores 100 access a series of memories 300 is illustrated.

In FIG. 2, it is assumed that only a single path (bus or network) is provided so as to access a memory 300 including (N+1) number of address spaces from the plurality of processing cores 100. Under this assumption, each of the processing cores 100 of FIG. 2 can access an address space of 0 to N. If the processing cores 100 concurrently access the address spaces, a bottleneck necessarily occurs due to the single path. Specifically, as the number of the processing cores 100 increases, the bottleneck increases. Accordingly, in the following embodiments, a multi-core system with a hierarchical structure capable of separating the memories from one another by hierarchically organizing the memories and allowing the processing cores to access the memories through various paths so as to prevent bottlenecking is provided.

However, in a case where memories are connected to one another through the hierarchical structure, a problem in that an access time for accessing a predetermined memory from a processing core may change. Since the memories are hierarchically organized and separated, distances between a processing core and the memories are different from one another. For example, the access time is the shortest when the processing core accesses a fast near memory such as a scratch-pad memory. The access time is relatively longer when the processing core accesses a distant memory. If the multi-core system is designed based on a network, a transmission time consumed in the communication channel and a forwarding processing time consumed in a bridge or router will be added, and accordingly, the access time will be increased.

That is, in the multi-core system in which the memories are connected through an hierarchical structure, it may be difficult to perform task scheduling based on estimation of an execution time. Specifically, in an embedded system or real-time system, an execution time may be changed based on processing cores to which application programs (tasks) are allocated. Accordingly, it is impossible to calculate a correct task scheduling result.

In addition, although the execution time is approximately estimated by previously determining processing cores and memories for executing application programs by using information on hardware when designing a system, in a case where an error or malfunction occurs in a part of the processing cores and the memories while the system is operating, if task migration for moving an application program from a current processing core allocated for the application program to another processing core occurs, a problem results in that it is impossible to use the estimation result.

Accordingly, in the following embodiments, a method, medium, and apparatus for managing a memory so as to estimate an execution time regardless of a processing core to which the application program is allocated and regardless of a memory to be used by the application program will be described. In addition, a method, medium and apparatus for allocating and managing memories so that an exiting memory access time is maintained even in a case where the application program is moved from the current processing core to another processing core or even in a case where an error occurs in the memories is described.

Figure 3:
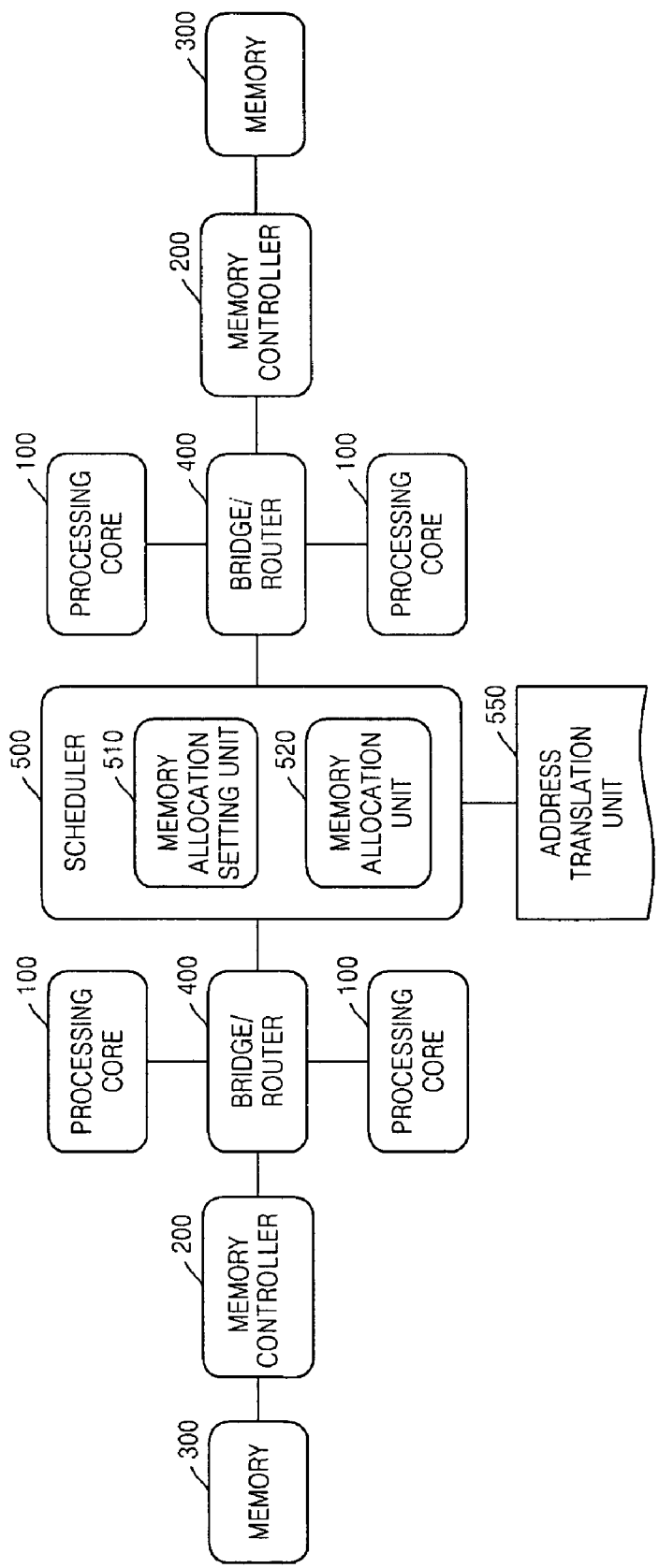
FIG. 3 is a block diagram illustrating a memory management apparatus of a multi-core system according to an embodiment of the present invention.

FIG. 3 is a block diagram illustrating a memory management apparatus of a multi-core system according to an embodiment of the present invention. FIG. 3 is obtained by adding a memory controller 200, a bridge or router 400, a scheduler 500, and the like to the structure of FIG. 1. Referring now to FIGS. 1 and 3, an address translation unit 550 corresponding to the MMU 150 serves to perform address mapping for memories with a hierarchical structure. Since the current embodiment assumes a multi-core system including a plurality of processing cores and a plurality of memories having different access times based on distances from the processing cores, the memory management apparatus has a bilateral symmetry with respect to the scheduler 500. The memory management apparatus may include at least two structures on the left and right sides. Hereinafter, structures that are not shown in FIG. 1 will be described.

The memory controller 200 controls accesses to a memory 300 for the processing core 100 or allocation of a predetermined address space of the memory. The bridge or router 400 connects the memory controller 200 to a plurality of processing cores 100. Devices may be connected to one another through a bus or network. The scheduler 500 selects a predetermined task from among tasks stored in a disk according to a scheduling rule, transmits the task to the memory 300, and determines a processing core 100 through which the task is to be performed. In general, a process control block (PCB) is added to the selected task and loaded to the memory. This is referred to as a process. The scheduler 500 is a logical concept constructed with a processor and physical devices to which specific memories are allocated. Hereinafter, components constituting the scheduler 500 will be described below with reference to FIG. 4.

A memory allocation setting unit 510 of FIG. 3 sets a memory allocation order based on distances from the processing cores 100 to the memories 300 in correspondence with the processing cores 100. As described above, since in the multi-core system with the hierarchical structure, memories are hierarchically organized and separated, access times from the processing cores 100 are different. Thus, the memory allocation setting unit 510 calculates distances from the processing cores 100 to the memories and sets the memory allocation order based on the calculated distances. Here, the memories are generally allocated in the ascending order of distances. If necessary, another allocation order of the memories may used. This procedure corresponds to operation 410 of FIG. 4. In operation 410, information on distances between processing cores (100 of FIG. 3) and memories (300 of FIG. 3) is previously secured and used for allocation of memories and task migration.

The address translation unit 550 of FIG. 3 translates a logical address to be processed by one of the processing cores 100 according to the memory allocation order that is set by the memory allocation setting unit 510 into a physical address of one of the memories 300. Here, the logical address indicates an address used for a task to be processed according to a task scheduling policy of the scheduler 500. For example, the logical address may be an address of a data structure to be used for an application program to be processed by the processing cores 100. Like the aforementioned MMU (150 of FIG. 1), it is also possible to embody the address translation unit 550 by using hardware such as a logical circuit or software such as a mapping table. This procedure corresponds to operation 420 of FIG. 4. In operation 420, address translation of the multi-core system with the hierarchical structure is performed.

A memory allocation unit 520 of FIG. 3 allocates a memory 300 corresponding to the physical address that is translated by the address translation unit 550 to the processing cores 100. This procedure corresponds to operation 430 of FIG. 4.

Up to now, the memory management apparatus and method of the multi-core system for connecting memories to one another through the hierarchical structure was described. In embodiments, it is easy to estimate an execution time of a task to be executed by allocating memories to processing cores by using information on distances between the processing cores and the memories. In addition, it is possible to secure the same memory access time by allocating memories having the same physical distance even if task migration occurs between processing cores.

Figure 5A:
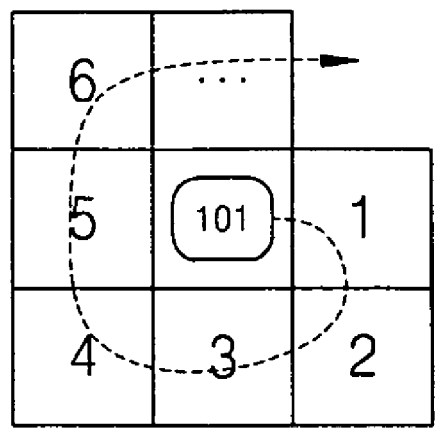
FIGS. 5A and 5B illustrate methods of allocating memories to processing cores in a multi-core system according to an embodiment of the present invention.
Figure 5B:
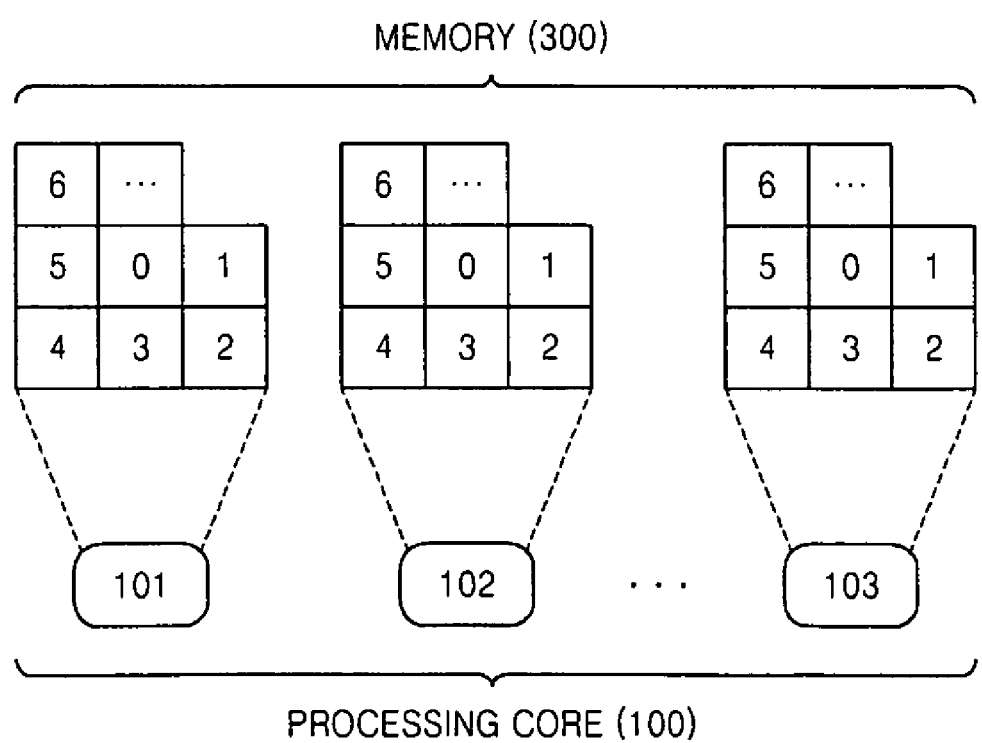

FIGS. 5A and 5B illustrate methods of allocating memories to processing cores in a multi-core system according to an embodiment of the present invention.

FIG. 5A illustrates an allocation order of memories surrounding one 101 of a plurality of processing cores. The memories surrounding the processing core 101 are allocated in an ascending order of distances from the processing core 101 in a spiral shape. Memories allocated 1 to 6, conceptually indicate memories surrounding the processing core 101 in the ascending order to the distances from the processing core 101. Hereinafter, this memory allocation method is referred to as a spiral memory allocation method. That is, the spiral memory allocation method is a method of allocating memories in the ascending order of distances from the processing core.

FIG. 5B illustrates an order of allocating memories 300 surrounding a plurality of processing cores 100. Since the processing cores 101, 102, . . . , 103 construct an allocation order of memories with respect to themselves, physical addresses of memories corresponding to the allocation order of the processing cores may be different. For example, a physical address of a memory corresponding to a second nearest neighbor memory of a processing core of 101 may be different from a physical address of a second nearest neighbor memory of a processing core 102. On the other hand, the physical address of the second nearest neighbor memory of the processing core 101 may be the same as a physical address of a fifth nearest neighbor memory of the processing core 102.

In FIG. 5B, since the memory allocation order corresponding to the processing cores 100 represents a degree of closeness of the memories 300 regardless of locations of the processing cores 100, each order secures the same access time for the processing cores 100. For example, if the allocation order is determined based on distances between the processing cores 100 and the memories 300, it will take the same time to allow the processing cores 101 to 103 to access third nearest neighbor memories of the processing cores 101 to 103.

Figure 6A:
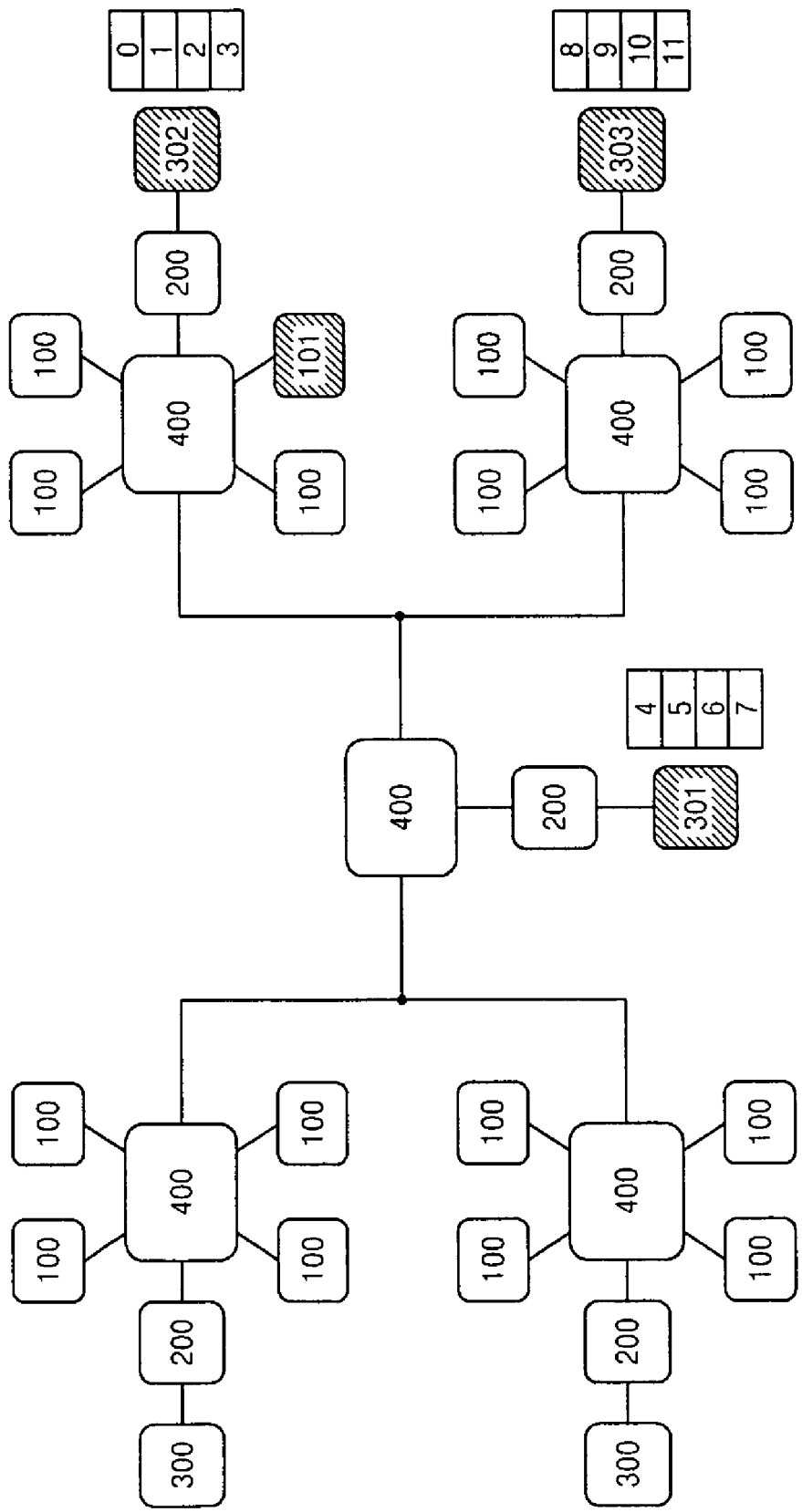
FIGS. 6A and 6B illustrate examples of an order of allocating memories to processing cores in a multi-core system according to an embodiment of the present invention.
Figure 6B:
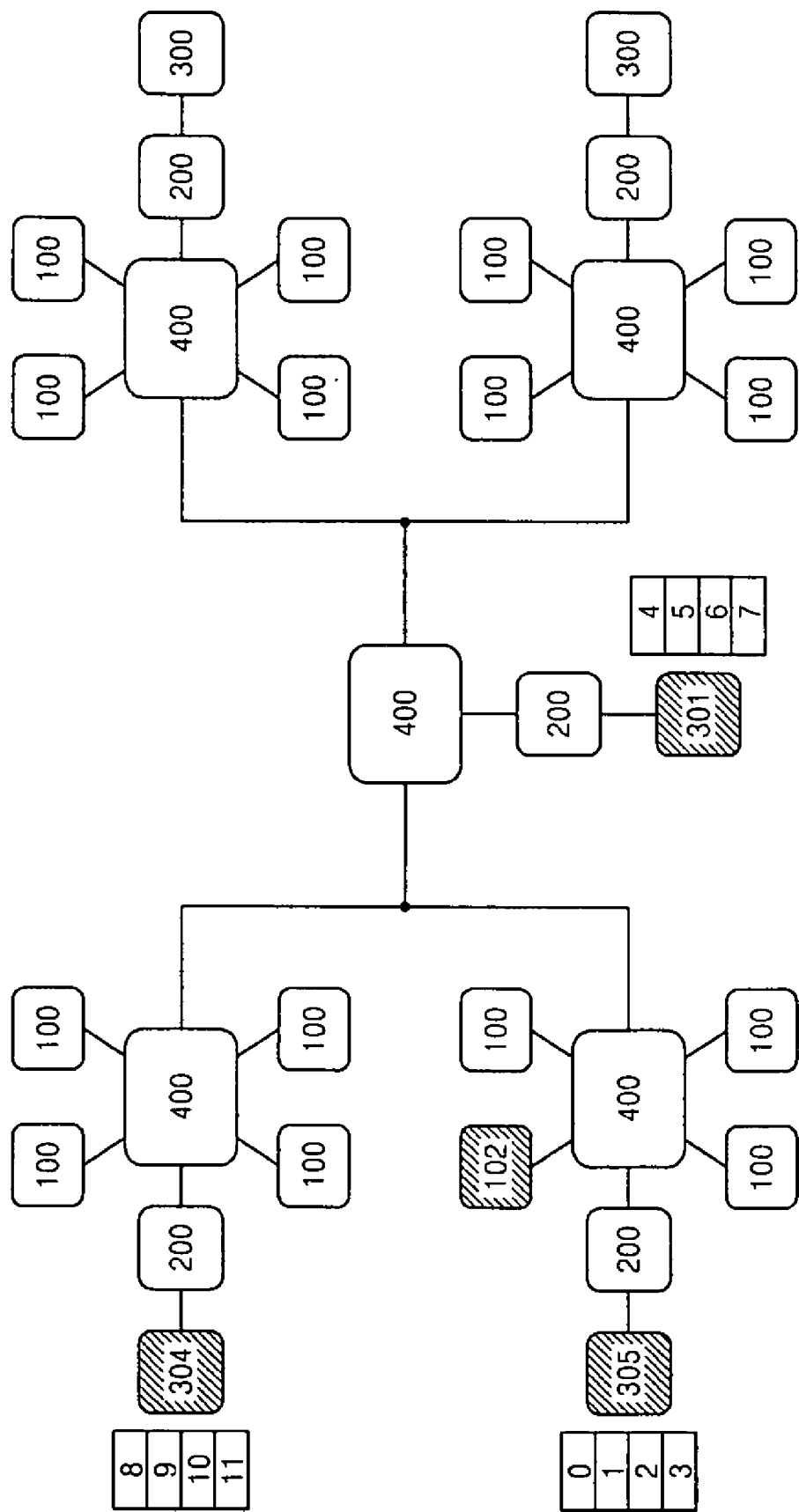

FIGS. 6A and 6B illustrate examples of an order of allocating memories to processing cores in a multi-core system according to an embodiment of the present invention by omitting the scheduler (500 of FIG. 3), the address translation unit (550 of FIG. 3), and the like. For convenience, each of memories 301 to 303 includes four unit address spaces. Positions of the memories 301 to 303 are arbitrarily assumed in the following description. It is possible to calculate distances between the processing cores 100 and the memories 301 to 303, under this assumption. It is possible to determine the memory allocation order based on the distances.

FIG. 6A illustrates an example of an order of allocating the memories 301 to 303 surrounding the processing core 101. The nearest neighbor memory of the processing core 101 is the memory 302. Four address spaces 0 to 3 may be allocated to the memory 302 in order. Then, the second nearest neighbor memory of the processing core 101 is the memory 301. Four address spaces 4 to 7 may be allocated to the memory 301 in order. Subsequently, four address spaces 8 to 11 may be allocated to the third nearest neighbor memory 303 of the processing core 101. The access order may be set through the same method with respect to the rest of the memories 300.

On the other hand, the same memory allocation order as the processing core 101 may be also applied to three processing cores 100 near the processing core 101 through the bridge or router 400. That is, the processing cores 100 and 101 near the bridge or router 400 form a series of groups having the same relation on distances to the neighboring memories 300 to 303. This is because the processing cores 100 and 101 connected to the bridge or router 400 form a series of groups for each memory controller 200 for securing the same access time for the memory 302. A factor for determining formation of a group is the memory controller 200.

Accordingly, at least one memory allocation order may be generated for each group. That is, although a memory allocation order is generated for each processing core, some of the generated memory allocation orders are repeated. Thus the repeated memory allocation orders are unnecessary.

FIG. 6B illustrates an example of an order of allocating the memories 301, 304, and 305 surrounding the processing core 102. It is possible to allocate four address spaces to the memories 305, 301, and 304 in the ascending order of distances from the processing core 102 by using a similar method as used in FIG. 6A.

Up to now, a memory allocation method in the multi-core system with the hierarchical structure has been described through various embodiments. Hereinafter, a format of a logical address for the multi-core system and a method of translating a logical address into a physical address will be described.

Figure 7A:
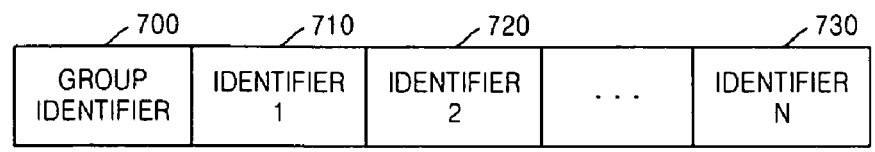
FIGS. 7A and 7B illustrate examples of a format of a logical address for a multi-core system according to an embodiment of the present invention.
Figure 7B:
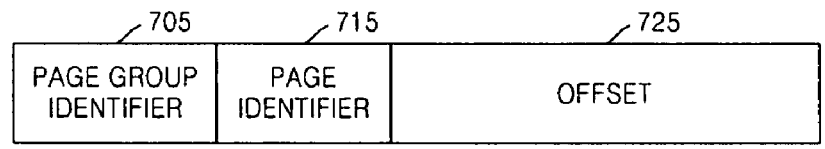

FIGS. 7A and 7B illustrate examples of a format of a logical address for a multi-core system according to an embodiment of the present invention.

FIG. 7A illustrates an example of a general format of a logical address for the multi-core system. The logical address includes a group identifier 700 for identifying a group having the same access time from a processing core to a memory and one or more identifiers 710, 720, and 730 for identifying sub-memory units included in the group. Here, the group indicates one of the series of groups illustrated in FIG. 6A. The group is a conceptual identification unit of devices having the same access time from the processing core to the memory. In addition, the sub-memory unit indicates an identification unit smaller than a group. One or more sub-memory units may exist. Each sub-memory unit is hierarchically constructed. The logical address of FIG. 7A has a format including a group identifier 700 and N number of sub-identifiers.

FIG. 7B illustrates an example of a detail format of the logical address of FIG. 7A. The logical address includes a page group identifier 705, a page identifier 715, and an offset 725. In general, an operating system (OS) divides a physical memory into regions having the same fixed size, referred to as pages, and uses the pages to solve problems of memory fragments due to successive memory allocation. In an embodiment, a page group indicates a unit for identifying a series of groups formed by pages. The page group corresponds to the group of FIG. 6A and the group of FIG. 7A. Accordingly, a page group is formed for each memory controller (200 of FIG. 6A). The page group identifier 705 is allocated to each memory controller (200 of FIG. 6A).

The page identifier 715 indicates a unit for identifying an individual page included in a page group. The page identifier 715 indicates an address allocated to each page included in a page group. The page identifier 715 may have a size of 4 KB. This size may be changed based on a system and an application program. The offset 725 may be used to identify an address of a memory in a page. The offset 725 represents a position of a memory from a starting address of the page. Hereinafter, an address translation method using the logical address format exemplified in FIG. 7B will be described.

Figure 8A:
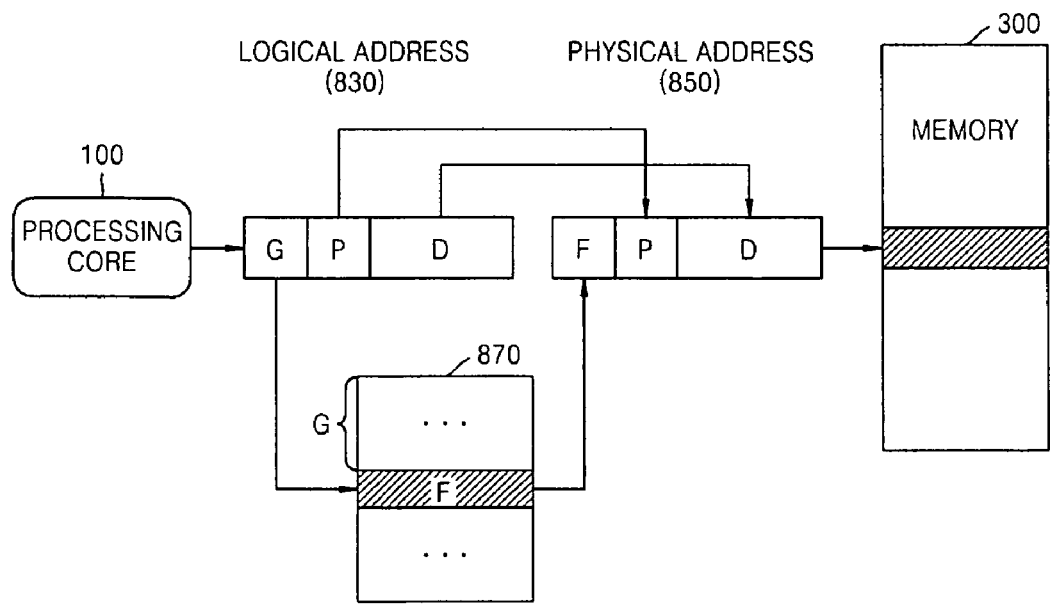
FIGS. 8A to 8C illustrate examples of a method of translating a logical address into a physical address in a multi-core system according to an embodiment of the present invention.
Figure 8B:
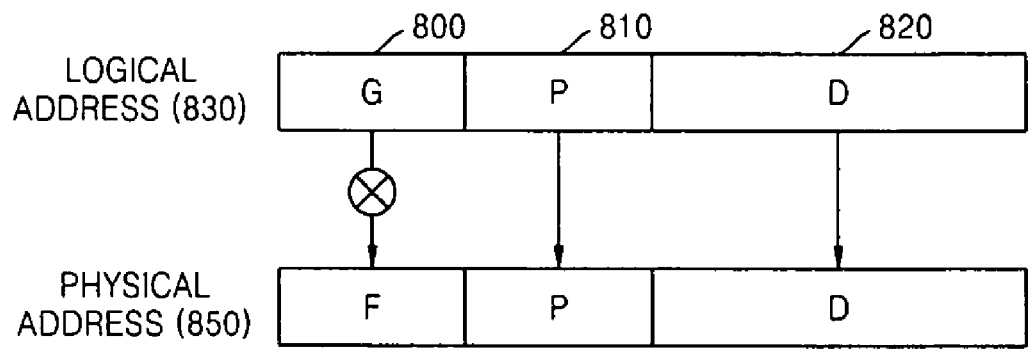
Figure 8C:
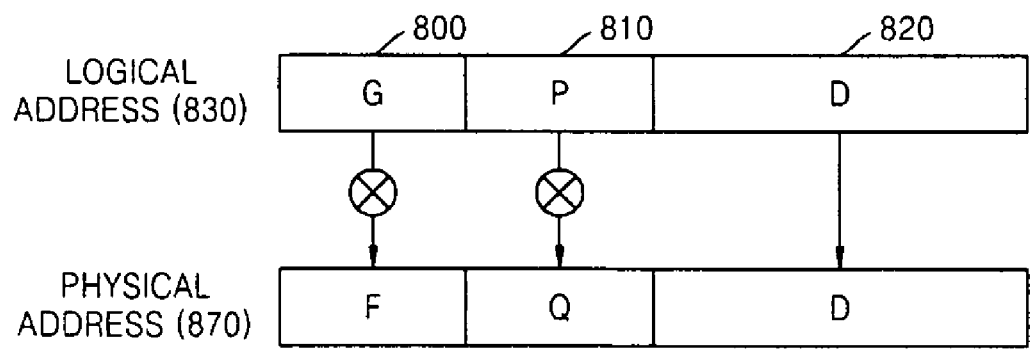

FIGS. 8A to 8C illustrate examples of a method of translating a logical address into a physical address in a multi-core system according to an embodiment of the present invention. In FIG. 8A, a page group identifier, a page identifier, and an offset, which constitute a logical address 830, are denoted by G, P, and D, respectively. A physical address 850 has the same format as the logical address. A page group identifier, a page identifier, and an offset of the physical address 850 are denoted by F, P, and D, respectively. The aforementioned memory allocation order is previously determined. In order to translate the logical address 830 into the physical address 850, a mapping table 870 is used. The mapping table 870 is a data structure including a part (here, the page group identifier G of the logical address) of the logical address 830 and a part (here, the page group identifier F of the physical address) of the physical address 850 corresponding to the part of the logical address 830.

A procedure of translating the logical address into the physical address according to an embodiment will be described with reference to FIG. 8A. First, an identifier of the physical address 850 corresponding to an identifier of the logical address 830 used for the processing core 100 is searched for by using the previously determined memory allocation order. In FIG. 8A, the mapping table 870 is searched for the page group identifier F of the physical address 850 by using the page group identifier G of the logical address 830 as an index.

Subsequently, the physical address is calculated by using the logical address and the found identifier. In FIG. 8A, the physical address 850 is calculated by substituting the found page group identifier F for the page group identifier G of the logical address 830. Various methods may be used for this calculation. The method of calculating the physical address will be easily understood by those skilled in the art. The calculated physical address 850 is used to access the real memory 300.

FIG. 8B illustrates only addresses in the aforementioned procedure. When the logical address 830 is translated into the physical address 850, only a page group identifier 800 is changed from G to F, and the page identifier 810 and the offset 820 are maintained as P and D, respectively. At this time, the change of the page group identifier 800 is performed by an MMU (not shown). This mapping may be embodied by using software such as a mapping table (870 of FIG. 8A) or hardware such as a logical circuit according to a position of the MMU and a distance to a destination of the logical address.

Unlike FIG. 8B, in FIG. 8C, a case where the multi-core system supports a virtual address is assumed.

In a case where a virtual address is included in the logical address 830, address translation of the page identifier 810 is changed. Like FIGS. 8A and 8B, address translation of the page group identifier 800 is performed by an MMU (not shown) through the mapping table (870 of FIG. 8A). On the other hand, the page identifier 810 calculates a page identifier Q of the physical address corresponding to a page identifier P of the virtual address according to a virtual address mapping algorithm for translating the virtual address into the physical address. Various translation methods such as dynamic address translation (DAT) have been developed as the mapping algorithm. This will be easily recognized by those skilled in the art.

The physical address 870 is calculated by using the page group identifier F of the calculated physical address 870, the page identifier Q of the physical address 870, and the offset D of the logical address 830. The translation of the page group identifier 800 and the translation of the page identifier 810 may be independently performed by using different algorithms. In addition, in a case where the processing core (not shown) and the MMU (not shown) support the virtual address, the address mapping method for the page group identifier may be embodied by using not hardware but software.

FIG. 9 illustrates an example of a structure of a mapping table for translating an address in a multi-core system according to an embodiment of the present invention. The mapping table is an index including a page group identifier of a logical address 930 and a page group identifier of a physical address 950 corresponding to the page group identifier of the logical address 930. A distance 970 from a processing core to a memory is essential information for generating the mapping table. However, when the mapping table is previously generated, the distance 970 may not be stored in the mapping table. The address translation method is the same as the aforementioned description with reference to FIGS. 8A to 8C.

FIG. 10 is a flowchart of a method of setting an allocation order of memories in a multi-core system according to an embodiment of the present invention. Each operation will be described with reference to the mapping table of FIG. 9.

In operation 1010, distances (970 of FIG. 9) between processing cores and memories are calculated by using information on a hardware structure.

In operation 1020, a physical access order to the memories is determined by aligning the distances calculated in operation 1010. This operation is performed so as to determine an order of closeness from the memories through a spiral memory allocation method. If a plurality of memories corresponding to the same distance exists, page group identifiers of the physical addresses having the same distance forms a group. For example, in FIG. 9, there are four memories having a distance 970 of 1 and two memories having a distance 970 of 2. The memories having the same distance may have no memory allocation order in principle.

It may be necessary to align the memories corresponding to the same distance according to a predetermined rule for the convenience of calculation and consistent memory allocation. The alignment in a group is not essential. The alignment may be performed if necessary. Here, a method of aligning the memories in the order of the page group identifiers of the physical addresses 950 may be used as the predetermined rule.

In operation 1030, the physical addresses of the memories may be mapped to the logical addresses to be processed by the processing cores in the access order determined in operation 1020. As described above, the mapping relation may be stored in a form of a mapping table and used.

Up to now, the method and apparatus for translating the logical addresses of the multi-core system into the physical addresses was described. It is possible to estimate an access time from the processing cores to the memories by calculating distances between the processing cores and the memories and aligning memories according to the distances. Accordingly, it is possible to secure the same access time with respect to the same logical address for the processing cores.

Hereinafter, methods of managing memories under various situations where tasks are migrated from a current processing core to another processing core will be described.

In a case where a load imbalance in which more tasks are allocated to a specific processing core than to other processing cores occurs in a general OS, a load balancing process is performed so as to balance the tasks by migrating the tasks from a processing core with a large load to another processing core with a small load. Under this situation, a memory management method of the multi-core system according to an embodiment will be described.

First, another processing core and another memory between which distance is the same as the distance between the processing core and the memory are selected according to a command for migrating a task performed by the processing core. Subsequently, the allocated memory is copied to a physical address of the selected memory. This procedure will be performed through a predetermined structure included in a device such as a scheduler (500 of FIG. 5). For convenience, this predetermined structure is referred to as a task migration unit.

If not a normal load balancing command but an error occurs in a processing core or memory, the memory management method of the multi-core system is changed.

First, in a case where an error or malfunction of the processing core is sensed through a sensing unit, the task migration unit selects another processing core and another memory between which distance is the same as the distance from the processing core to the allocated memory according to the sensing result. Subsequently, the task migration unit copies codes and data of the task that is performed by the processing core from the allocated memory and allocates the codes and the data to the selected processing core. The allocated memory is recovered and used for other purposes.

Second, in a case where the sensing unit senses an error or malfunction of the allocated memory, the task migration unit also selects another processing core and another memory between which distance is the same as the distance from the processing core to the allocated memory according to the sensing result. Subsequently, the task migration unit newly receives codes and data of the task that is performed by the processing core from a disk and allocates the codes and the data to the selected processing core. If an error occurs in a part of the memory that is used by the task, only the other part that normally operates is recovered and use for other purposes.

According to the aforementioned embodiments, in a case where a task is migrated from the current processing core to another processing core while the multi-core system is operating, or in a case where an error occurs in the current processing core or memory, it is possible to maintain the current access time to the memory by allocating a memory corresponding to a distance that is the same as the distance from the current processing core to the memory.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing of the computer readable code.

The computer readable code can be recorded on a medium in a variety of ways, with examples of the medium including recording media, such as magnetic storage media (e.g., ROM, floppy disks, hard disks, etc.) and optical recording media (e.g., CD-ROMs, or DVDs). The computer readable code can also be transferred on transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A memory management method of a multi-core system including a plurality of processing cores and a plurality of memories of which access times are different based on distances from the processing cores, the memory management method comprising:

setting a memory allocation order according to distances from the processing cores to the memories corresponding to the processing cores;

translating a logical address to be processed by one of the processing cores, according to the set memory distance allocation order, into a physical address of one of the memories;

allocating a memory corresponding to the translated physical address to the one of the processing cores;

logically mapping the physical addresses of the allocated memory to logical addresses;

selecting a new processing core and a new memory between which a distance is the same as a distance between the one of the processing cores and the memory allocated to the one of the processing cores; and copying the allocated memory to a physical address of the selected new memory.

2. The memory management method of claim 1, wherein the setting of the memory allocation order includes:

calculating the distances between the processing cores and the memories by using information on a hardware structure;

determining a physical access order to the memories by aligning the calculated distances; and mapping physical addresses of the memories to logical addresses to be processed by the processing cores according to the determined physical access order.

3. The memory management method of claim 1, wherein the logical address includes a group identifier for identifying a group having a same access time from the processing cores to the memories and one or more identifiers for identifying sub-memory units included in the group.

4. The memory management method of claim 1, wherein the translating of the logical address into the physical address includes:
  searching for an identifier of a physical address corresponding to an identifier of the logical address by using the set memory allocation order; and
  calculating the physical address by using the logical address and the identifier found by the searching.

5. The memory management method of claim 1, wherein in a case where the logical address includes a virtual address, the translating the logical address into the physical address comprises:
  searching for a first identifier of a physical address corresponding to an identifier of the logical address by using the set memory allocation order;
  searching for a second identifier of a physical address corresponding to the virtual address according to a predetermined mapping algorithm; and
  calculating the physical address by using the logical address, the first identifier found in the searching for the first identifier, and the second identifier found in the searching for the second identifier.

6. The memory management method of claim 1, further comprising:
  sensing an error of the processing core;
  selecting a new processing core and a new memory between which a distance is the same as a distance between the one of the processing cores and the memory allocated to the one of the processing cores according to whether the error is sensed; and
  copying codes and data of a task performed by the one of the processing cores from the allocated memory and allocating the codes and the data to the selected new processing core.

7. The memory management method of claim 1, further comprising:
  sensing an error of the allocated memory;
  selecting a new processing core and a new memory between which a distance is the same as a distance between the one of the processing cores and the memory allocated to the one of the processing cores according to whether the error is sensed; and
  newly receiving codes and data of a task performed by the one of the processing cores and allocating the codes and the data to the selected new processing core.

8. A non-transitory computer-readable recording medium having embodied thereon a computer program for causing a computer to execute the method of claim 1.

9. A memory management apparatus of a multi-core system including a plurality of processing cores and a plurality of memories of which access times are different based on distances from the processing cores, the memory management apparatus comprising:
  a memory allocation setting unit setting a memory allocation order according to distances from the processing cores to the memories in correspondence with the processing cores;
  an address translation unit translating a logical address to be processed by one of the processing cores according to the set memory distance allocation order into a physical address of one of the memories;
  a memory allocation unit allocating a memory corresponding to the translated physical address to the one of the processing cores, and logically mapping the physical addresses of the allocated memory to logical addresses
  a task migration unit selecting a new processing core and a new memory between which distance is the same as a distance between the one of the processing cores and the memory allocated to the one of the processing cores and copying the allocated memory to a physical address of the selected new memory.

10. The memory management apparatus of claim 9, wherein the memory allocation setting unit calculates the distances by using information on a hardware structure between the processing cores and the memories, determines a physical access order to the memories by aligning the calculated distances, and maps physical addresses of the memories to logical addresses to be processed by the processing cores according to the determined physical access order.

11. The memory management apparatus of claim 9, wherein the logical addresses include a group identifier for identifying a group having a same access time from the processing cores to the memories and one or more identifiers for identifying sub-memory units included in the group.

12. The memory management apparatus of claim 9, wherein the address translation unit searches for an identifier of a physical address corresponding to an identifier of the logical address by using the set memory allocation order and calculates the physical address by using the logical address and the identifier found by the address translation unit.

13. The memory management apparatus of claim 9, wherein in a case where the logical address includes a virtual address, the address translation unit searches for a first identifier of a physical address corresponding to an identifier of the logical address by using the set memory allocation order, searches for a second identifier of a physical address corresponding to the virtual address according to a predetermined mapping algorithm, and calculates the physical address by using the logical address, the first identifier found by the address translation unit, and the second identifier found by the address translation unit.

14. The memory management apparatus of claim 9, further comprising:
  a sensing unit sensing an error of the processing core; and
  a task migration unit selecting a new processing core and a new memory between which a distance is the same as a distance between the one of the processing cores and the memory allocated to the one of the processing cores according to whether the sensing unit senses an error and copying codes and data of a task performed by the one of the processing cores from the allocated memory and allocating the codes and the data to the selected new processing core.

15. The memory management apparatus of claim 9, further comprising:
  a sensing unit sensing an error of the allocated memory; and
  a task migration unit selecting a new processing core and a new memory between which a distance is the same as a distance between the one of the processing cores and the memory allocated to the one of the processing cores according to whether the sensing unit senses an error and newly receiving codes and data of a task performed by the one of the processing cores and allocating the codes and the data to the selected new processing core.

* * * * *